United States Patent
Mori et al.

(10) Patent No.: US 12,391,854 B2
(45) Date of Patent: Aug. 19, 2025

(54) ADHESIVE AGENT SET AND METHOD FOR MANUFACTURING STRUCTURAL BODY

(71) Applicant: Showa Denko Materials Co., Ltd., Tokyo (JP)

(72) Inventors: Kazuhiko Mori, Tokyo (JP); Nanako Arima, Tokyo (JP); Shuya Yamazaki, Tokyo (JP); Shun Sato, Tokyo (JP)

(73) Assignee: Resonac Corporation, Tokyo (JP)

( * ) Notice: Subject to any disclaimer, the term of this patent is extended or adjusted under 35 U.S.C. 154(b) by 744 days.

(21) Appl. No.: 17/600,219

(22) PCT Filed: Apr. 5, 2019

(86) PCT No.: PCT/JP2019/015172
§ 371 (c)(1),
(2) Date: Sep. 30, 2021

(87) PCT Pub. No.: WO2020/202561
PCT Pub. Date: Oct. 8, 2020

(65) Prior Publication Data
US 2022/0204824 A1    Jun. 30, 2022

(51) Int. Cl.
*C09J 175/04* (2006.01)
*C09J 11/06* (2006.01)

(52) U.S. Cl.
CPC .......... *C09J 175/04* (2013.01); *C09J 11/06* (2013.01); *C09J 2475/00* (2013.01)

(58) Field of Classification Search
CPC .............. C08G 18/289; C08G 18/3876; C08G 18/792; C08G 18/809; C09J 175/04–10; C09J 175/08; C09J 2475/00; C09J 2475/001; C09J 2475/003; C09J 5/00
See application file for complete search history.

(56) References Cited

U.S. PATENT DOCUMENTS

2021/0355355 A1*  11/2021  Matsuki ................. C09J 175/04

FOREIGN PATENT DOCUMENTS

| CN | 109072037 A | 12/2018 |
|----|---|---|
| CN | 109563393 A | 4/2019 |
| JP | 2004-131625 A | 4/2004 |
| JP | 2006-111811 A | 4/2006 |
| JP | 2006-213801 A | 8/2006 |
| JP | 2006-220200 A | 8/2006 |
| JP | 2008-111072 A | 5/2008 |
| JP | 2014-025000 A | 2/2014 |
| JP | 2014-077094 A | 5/2014 |
| JP | 2014-080511 A | 5/2014 |
| JP | 2014-122301 A | 7/2014 |
| JP | 2014-122302 A | 7/2014 |
| JP | 2015-074685 A | 4/2015 |
| JP | 2018-021104 A | 2/2018 |
| WO | WO-2017/212824 A1 | 12/2017 |
| WO | WO-2018/025702 A1 | 2/2018 |
| WO | WO-2018/179178 A1 | 10/2018 |

* cited by examiner

*Primary Examiner* — Ana L. Woodward
(74) *Attorney, Agent, or Firm* — Faegre Drinker Biddle & Reath LLP

(57) ABSTRACT

Disclosed is an adhesive agent set composed of a main agent and a hardening agent, in which the main agent contains a urethane prepolymer having isocyanate groups as terminal groups; and an oligomer of hexamethylene diisocyanate having an isocyanate group modified with a silane coupling agent having a mercapto group or an amino group, the oligomer also having at least two unmodified isocyanate groups, and the hardening agent contains a polyol.

4 Claims, No Drawings

ADHESIVE AGENT SET AND METHOD FOR MANUFACTURING STRUCTURAL BODY

TECHNICAL FIELD

The present invention relates to an adhesive agent set and a method for manufacturing a structural body.

BACKGROUND ART

Steel plates are generally used for interior and exterior parts such as automobile bodies, front doors, rear doors, back doors, front bumpers, rear bumpers, and rocker moldings; however, weight reduction has been required to meet the demands for improving fuel efficiency in recent years. For this reason, there are increasing cases where plastic materials such as polypropylene are used as the interior and exterior parts of automobiles instead of steel plates. Incidentally, since plastic materials such as polypropylene have lower strength as compared to steel plates, it is common to increase the strength by adding talc, glass filler, or the like.

As an adhesive agent to be used between automobile parts made of a plastic such as polypropylene, urethane-based compositions have been proposed. Regarding the urethane-based compositions, a one-liquid type composition called moisture-hardening type, which is hardened by moisture in air or the like, and a two-liquid type composition in which an adhesive agent set composed of a main agent and a hardening agent is used to mix the main agent and the hardening agent, are known. Among these, from the viewpoint of workability in an adhesion process, a two-liquid type composition which can secure a sufficient working life (pot life, time taken for a multi-liquid coating material until the coating material begins to harden due to a chemical reaction or the like) and enables quick hardening, tends to be preferred.

Generally, since a polypropylene base material has a low surface polarity and is poorly adhesive, the polypropylene base material is subjected to a surface treatment of introducing a polar group on the base material surface in order to facilitate adhesion. Examples of the surface treatment include a plasma treatment, a corona treatment, and a flame treatment. Furthermore, since it is difficult to directly apply a urethane-based composition for the adhesion between polypropylene base materials that have been subjected to surface treatments, it is common to apply a urethane-based composition after each of the polypropylene base material has been subjected to a primer treatment as a pretreatment. However, in recent years, from the viewpoints of simplification of processes, improvement of the working environment, and the like, there is a demand for enhancing the adhesiveness in the case of not performing a primer treatment (that is, non-primer adhesiveness).

For example, in Patent Literature 1, a two-liquid type hardenable composition in which a main agent (first liquid) containing an isocyanate compound and a hardening agent (second liquid) containing ketimine are mixed at the time of operation, is disclosed.

CITATION LIST

Patent Literature

Patent Literature 1: JP No. 2004-131625

SUMMARY OF INVENTION

Technical Problem

However, there is no mention about primers in Patent Literature 1; however, as a result of an investigation conducted by the inventors of the present invention, it was found that it is difficult to adhere polypropylene base materials without performing a primer treatment when using the two-liquid type hardenable composition of Patent Literature 1. Furthermore, it was found that the two-liquid type hardenable composition of Patent Literature 1 is not sufficient even from the viewpoint of heat aging resistance.

Thus, it is a main object of the present invention to provide an adhesive agent set, with which an adhesive agent having excellent non-primer adhesiveness and excellent heat aging resistance can be prepared.

Solution to Problem

In order to achieve the above-described object, the inventors of the present invention conducted a thorough investigation, and as a result, the inventors found that an adhesive agent having excellent non-primer adhesiveness and also having excellent heat aging resistance can be prepared with an adhesive agent set by using specific components for the main agent, thus completing the present invention.

According to an aspect of the present invention, there is provided an adhesive agent set composed of a main agent and a hardening agent, in which the main agent contains a urethane prepolymer having an isocyanate group as a terminal group; and an oligomer of hexamethylene diisocyanate having an isocyanate group modified with a silane coupling agent having a mercapto group or an amino group, the oligomer also having at least two unmodified isocyanate groups, and the hardening agent contains a polyol.

The oligomer may be a trimer of hexamethylene diisocyanate having an isocyanate group modified with a silane coupling agent having a mercapto group or an amino group, the trimer also having two unmodified isocyanate groups.

At least one of the main agent and the hardening agent may further contain a hardening catalyst.

According to another aspect, the present invention provides a method for manufacturing a structural body, the method including sticking a first base material and a second base material together, with a mixture obtainable by mixing the main agent and the hardening agent in the above-mentioned adhesive agent set interposed therebetween, to obtain a structural body.

Advantageous Effects of Invention

According to the present invention, there is provided an adhesive agent set, with which an adhesive agent having excellent non-primer adhesiveness and also having excellent heat aging resistance can be prepared. Furthermore, according to the present invention, there is provided a method for manufacturing a structural body using the adhesive agent set.

DESCRIPTION OF EMBODIMENTS

Embodiments of the present invention will be described below. However, the present invention is not intended to be limited to the following embodiments. According to the present specification, a numerical value range expressed using the term "to" indicates a range including the numerical values described before and after the term "to" as the minimum value and the maximum value, respectively. Furthermore, with regard to numerical value ranges described stepwise in the present specification, the upper limit value or lower limit value of a numerical value range of any one stage may be replaced with the upper limit value or lower limit value of a numerical value range of another stage. With regard to a numerical value range described in the present specification, the upper limit value or the lower limit value of the numerical value range may be replaced with the values disclosed in the Examples.

[Adhesive Agent Set]

An adhesive agent set according to an embodiment is composed of a main agent and a hardening agent. With regard to the adhesive agent set according to the present embodiment, a mixture (two-liquid hardening type urethane-based composition) can be prepared by mixing the main agent and the hardening agent. The mixture (two-liquid hardening type urethane-based composition) hardens with the lapse of time and can act as an adhesive agent that adheres a base material to another base material.

The (A) main agent contains: (a) a urethane prepolymer having an isocyanate group as a terminal group; and (b) an oligomer of hexamethylene diisocyanate having an isocyanate group modified with a silane coupling agent having a mercapto group or an amino group, the oligomer also having at least two unmodified isocyanate groups (hereinafter, may be referred to as "modified hexamethylene diisocyanate oligomer"). The (B) hardening agent contains (c) a polyol. At least one of the (A) main agent and the (B) hardening agent may contain any one of (d) a hardening catalyst, (e) carbon black, (f) a filler, and (g) a plasticizer. In the following description, each component will be explained.

<(a) Urethane Prepolymer>

Component (a) is a reaction product of a compound having two or more active hydrogen groups and a polyisocyanate compound having two or more isocyanate groups. Regarding the component (a), a product having isocyanate groups as the terminal groups can be obtained by reacting the compounds so as to have an excess number of isocyanate groups. Examples of the active hydrogen group include a hydroxy group (OH group), a carboxyl group (COOH group), an amino group ($NH_2$ group), and a mercapto group (SH group). The compound having two or more active hydrogen groups may be a polyol, which is a compound having two or more hydroxy groups (OH groups) or may be (a-1) a polyether polyol.

Examples of the polyisocyanate compound include an aromatic polyisocyanate in which an isocyanate group is bonded to an aromatic hydrocarbon; and an alicyclic polyisocyanate in which an isocyanate group is bonded to an alicyclic hydrocarbon. Among these, the polyisocyanate compound may be (a-2) an aromatic polyisocyanate or may be diphenylmethane diisocyanate. The compound having two or more active hydrogen groups and the polyisocyanate compound having two or more isocyanate groups may be respectively used singly, or two or more kinds thereof may be used in combination.

((a-1) Polyether Polyol)

The component (a-1) is not particularly limited as long as it is a polyether polyol having two or more OH groups. Specific examples include polyethylene glycol (PEG), polypropylene glycol (PPG), an ethylene oxide-propylene oxide copolymer, polytetramethylene ether glycol (PTMEG), and a sorbitol-based polyol. Among these, the component (a-1) may be polypropylene glycol (PPG). Furthermore, the component (a-1) may be used singly, or two or more kinds thereof may be used in combination.

The number average molecular weight of the component (a-1) may be 10000 or less or may be 9000 or less, 8000 or less, 7000 or less, or 6000 or less. When the number average molecular weight of the component (a-1) is 10000 or less, the mechanical strength of the adhesive agent after curing tends to become higher. The number average molecular weight of the component (a-1) is not particularly limited; however, the number average molecular weight may be, for example, 500 or more.

In the present specification, the term "number average molecular weight" is a value calculated by utilizing gel permeation chromatography (GPC) and using a calibration curve of polystyrene standards.

The GPC measurement conditions are as follows.

Measuring apparatus: ACQUITY UPLC APC system (manufactured by Waters Corp.)

Column: APC XT-900, APC XT-200, APC XT-125, APC XT-45 (manufactured by Waters Corp.)

Carrier: Tetrahydrofuran (THF)

Detector: Differential refraction

Sample: 0.5 mass % THF solution

Calibration curve: Polystyrene ((a-2) Aromatic Polyisocyanate)

Examples of component (a-2) include 4,4'-diphenylmethane diisocyanate (4,4'-MDI (monomeric MDI)) and 2,4'-diphenylmethane diisocyanate (2,4'-DMI).

The content of the component (a) may be 20% to 50% by mass, 25% to 45% by mass, or 30% to 40% by mass, based on the total amount of the (A) main agent. When the content of the component (a) is 20% by mass or more based on the total amount of the (A) main agent, there is a tendency that a decrease in the elongation rate of the adhesive agent after curing can be prevented, and when the content of the component (a) is 50% by mass or less based on the total amount of the (A) main agent, there is a tendency that a decrease in the adhesive strength of the adhesive agent after curing can be prevented.

<(b) Modified Hexamethylene Diisocyanate Oligomer>

Component (b) is an oligomer of hexamethylene diisocyanate having an isocyanate group modified with a silane coupling agent having a mercapto group or an amino group, the oligomer also having at least two unmodified isocyanate groups. The component (b) is a reaction product of (b-1) an oligomer of hexamethylene diisocyanate having an unmodified isocyanurate group (hereinafter, may be referred to as "unmodified hexamethylene diisocyanate oligomer") and (b-2) a silane coupling agent having a mercapto group or an amino group. When the reaction product is used as the component (b), the reaction product may include, in addition to the component (b), an oligomer of hexamethylene diisocyanate having isocyanate groups modified with the component (b-1) and the component (b-2) and one unmodified isocyanate group, or the like. In the case of using an unmodified hexamethylene diisocyanate trimer as the component (b-1), the component (b) may be a trimer of hexamethylene diisocyanate having an isocyanate group modified with the component (b-2) and two unmodified isocyanate groups. The isocyanate group modified with the component (b-2) in the component (b) can contribute to an enhancement of the interfacial adhesive force to a polypropylene base material, and the at least two unmodified isocyanate groups can contribute to the formation of crosslinks with the (c) polyol included in the hardening agent. Therefore, an adhesive agent having excellent non-primer adhesiveness and also having excellent heat aging resistance can be prepared with the adhesive agent set by using a main agent including such a component (b).

((b-1) Unmodified Hexamethylene Diisocyanate Oligomer)

The component (b-1) is not particularly limited as long as it is an oligomer of hexamethylene diisocyanate having an unmodified isocyanate group; however, for example, the component (b-1) may be a trimer of an isocyanurate form, a biuret form, an adduct form of trimethylolpropane (TMP), or the like. Examples of a commercially available product of such a trimer include SUMIDUR N3300 (trade name, manufactured by Sumika Bayer Urethane Co., Ltd.), DURANATE 24A-100 (trade name, manufactured by Asahi Kasei Corp.), and DURANATE E402-100 (trade name, manufactured by Asahi Kasei Corp.). The component (b-1) may be used singly or in combination of two or more kinds thereof.

((b-2) Silane Coupling Agent having Mercapto Group or Amino Group)

The silane coupling agent having a mercapto group is a silane compound having a mercapto group (SH group), which is an active hydrogen group capable of reacting with an isocyanurate group of the component (b-1), and a hydrolysable group. Examples of the silane coupling agent having a mercapto group include 3-mercaptopropylmethyldimethoxysilane and 3-mercaptopropyltrimethoxysilane. The silane coupling agent having a mercapto group may be used singly, or two or more kinds thereof may be used in combination. Furthermore, the silane coupling agent having a mercapto group may be used in combination with a silane coupling agent having an amino group, which will be described below.

The silane coupling agent having an amino group is a silane compound having an amino group ($NH_2$ group or NHR group (R: hydrocarbon group)), which is an active hydrogen group capable of reacting with an isocyanurate group of the component (b-1), and a hydrolysable group. Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, and N-(vinylbenzyl)-2-aminoethyl-3-aminopropyltrimethoxysilane. The silane coupling agent having an amino group may be used singly, or two or more kinds thereof may be used in combination. Furthermore, the silane coupling agent having an amino group may be used in combination with the above-mentioned silane coupling agent having a mercapto group.

The component (b) can be obtained by adjusting the addition amount of the component (b-1) and the component (b-2) based on the equivalent ratio of NCO groups of the component (b-1) with respect to SH groups or NH groups of the component (b-2) (NCO groups/SH groups or NH groups). For example, in the case of using an unmodified hexamethylene diisocyanate trimer as the component (b-1), since the component (b-1) usually has three NCO groups, a component (b) having an isocyanate group modified with the component (b-2) and two unmodified isocyanate groups can be obtained by adjusting the ratio (NCO groups/SH groups or NH groups) to the range of 2.5 to 3.5. The reaction between the component (b-1) and the component (b-2) may be carried out in the presence of a catalyst. The catalyst may be similar to, for example, the (d) hardening catalyst that will be described below. The content of the catalyst can be appropriately set in accordance with the types of the component (b-1) and the component (b-2), or the like. The temperature and time employed at the time of reacting the component (b-1) with the component (b-2) may be, for example, 35° C. to 50° C. and 2 to 5 hours.

The content of the component (b) may be 2% to 10% by mass, 2% to 7% by mass, or 3% to 6% by mass, based on the total amount of the (A) main agent. When the content of the component (b) is 2% by mass or more based on the total amount of the (A) main agent, there is a tendency that the adhesiveness between the base material surface and the adhesive agent is enhanced, and interfacial fracture occurring when the adhesive agent is torn off can be prevented, and when the content of the component (b) is 10% by mass or less based on the total amount of the (A) main agent, there is a tendency that a decrease in the adhesive strength after curing can be prevented.

<(c) Polyol>

Component (c) is not particularly limited as long as it is a polyol having two or more OH groups; however, for example, the polyether polyol mentioned as an example of the above-mentioned component (a-1) can be used. The number average molecular weight of the component (c) may be similar to the number average molecular weight of the component (a-1).

The content of the component (c) may be 35% to 60% by mass, or 40% to 55% by mass, based on the total amount of the (B) hardening agent. When the content of the component (c) is 35% by mass or more based on the total amount of the (B) hardening agent, there is a tendency that a decrease in the elongation rate of the adhesive agent after curing can be prevented, and when the content of the component (c) is 60% by mass or less based on the total amount of the (B) hardening agent, there is a tendency that a decrease in the adhesive strength after curing can be prevented.

<(d) Hardening Catalyst>

Regarding component (d), any known catalyst that promotes a urethanization reaction or a urea conversion reaction can be used. Examples of the component (d) include a tin catalyst and an amine catalyst, and the component (d) can be appropriately selected according to the desired hardening rate. Examples of the tin catalyst include dibutyltin dilaurate, dioctyltin dilaurate, dibutyltin didecanoate, dioctyltin didecanoate, and tin 2-ethylhexanoate. Examples of the amine catalyst include triethylenediamine, bis(dimethylaminoethyl) ether, and di(N,N-dimethylaminoethyl)amine.

The total content of the component (d) may be 0.1% to 10.0% by mass, 0.1% to 5.0% by mass, or 0.1% to 3.0% by mass, based on the total amount of the (A) main agent and the (B) hardening agent.

<(e) Carbon Black>

Regarding component (e), the average particle size thereof (D50: particle size at the 50% value of the volume particle size distribution curve) may be 20 to 40 nm or 25 to 35 nm. When the average particle size of carbon black is in the above-described range, the viscousness of the adhesive agent and the dispersibility of the carbon black are adjusted to more appropriate ranges, and the workability and strength of the adhesive agent tend to be further enhanced. The average particle size (D50) of the carbon black can be measured, for example, according to a laser diffraction light scattering method using "Model LS-230" manufactured by Beckman Coulter, Inc.

Examples of a commercially available product of the component (e) include MONARCH 460 (manufactured by Cabot Corporation), ASAHI CARBON 70 (manufactured by Asahi Carbon Co., Ltd.), SEAST 3 (manufactured by Tokai Carbon Co., Ltd.), MITSUBISHI CARBON 32 (manufactured by Mitsubishi Chemical Corporation), and NITERON 200 (manufactured by Nippon Steel Carbon Co., Ltd.).

The total content of the component (e) may be 5% to 40% by mass based on the total amount of the (A) main agent and the (B) hardening agent. When the total content of the component (e) is 5% by mass or more based on the total amount of the (A) main agent and the (B) hardening agent, the strength of the adhesive agent tends to increase, and when the total content is 40% by mass or less, dispersibility is enhanced so that there is a tendency that the strength of the adhesive agent can be maintained. The total content of the component (e) may be 10% to 30% by mass from the viewpoint that the workability and weather resistance of the adhesive agent can be further enhanced.

<(f) Filler>

Examples of component (f) include, in addition to the above-mentioned component (e), kaolin, talc, silica, titanium oxide, calcium carbonate, bentonite, mica, sericite, glass flakes, glass fiber, graphite, magnesium hydroxide, aluminum hydroxide, antimony trioxide, barium sulfate, zinc borate, alumina, magnesia, wollastonite, xonotlite, and whiskers.

The total content of the component (f) may be 5% to 40% by mass, or 10% to 30% by mass, based on the total amount of the (A) main agent and the (B) hardening agent.

<(g) Plasticizer>

Examples of the component (g) include a phthalic acid ester-based compound, an alkylsulfonic acid ester-based compound, and an adipic acid ester-based compound. Specific examples of the phthalic acid ester-based compound include dioctyl phthalate (DOP), dibutyl phthalate (DBP), diisononyl phthalate (DINP), diisodecyl phthalate (DIDP), and butyl benzyl phthalate (BBP).

The total content of the component (g) may be 5% to 40% by mass, or 10% to 30% by mass, based on the total amount of the (A) main agent and the (B) hardening agent.

At least one of the (A) main agent and the (B) hardening agent may further contain, in addition to the above-mentioned components, an ultraviolet absorber, a dehydrating agent, a pigment, a dye, an aging inhibitor, an oxidation inhibitor, an antistatic agent, a flame retardant, an adhesiveness imparting agent, a dispersant, a solvent, and the like.

The viscosity at 20° C. of the (A) main agent may be, for example, 500 to 2000 Pa·s, 1000 to 2000 Pa·s, or 1250 to 1750 Pa·s. When the viscosity at 20° C. of the (A) main agent is 500 Pa·s or more, the bead shape obtainable when the adhesive agent is applied tends to be easily maintained. When the viscosity at 20° C. of the (A) main agent is 2000 Pa·s or less, the air pressure required when discharging the adhesive agent can be suppressed, and discharge tends to be easily achieved. According to the present specification, the viscosity at 20° C. means the viscosity at 20° C. measured using a B type rotational viscometer (trade name: VISCOMETER-TV25H, manufactured by Toki Sangyo Co., Ltd., applied rotor: No. 7).

The viscosity at 20° C. of the (B) hardening agent may be, for example, 500 to 2000 Pa·s, 1000 to 2000 Pa·s, or 1250 to 1750 Pa·s. When the viscosity at 20° C. of the (B) hardening agent is 500 Pa·s or more, the bead shape obtainable when the adhesive agent is applied tends to be easily maintained. When the viscosity at 20° C. of the (B) hardening agent is 2000 Pa·s or less, the air pressure required when discharging the adhesive agent can be suppressed, and discharge tends to be easily achieved.

When the (A) main agent and the (B) hardening agent are mixed, it is preferable that the equivalent ratio of isocyanate groups (NCO) in the (A) main agent with respect to hydroxyl groups (OH) in the (B) hardening agent (NCO groups/OH groups) is adjusted to, for example, 1.0 to 5.0. When the equivalent ratio (NCO groups/OH groups) is 1.0 or more, since the abundance ratio of unreacted polyol is small at the time of mixing the main agent and the hardening agent, sufficient adhesion characteristics tend to be obtained. When the equivalent ratio (NCO groups/OH groups) is 5.0 or less, the abundance ratios of the isocyanate and the prepolymer are in appropriate ranges at the time of mixing the main agent and the hardening agent, the proportion of reaction with moisture in air can be suppressed, and sufficient hardenability tends to be obtained. Incidentally, the isocyanate groups in the (A) main agent mainly originate from the (a) urethane prepolymer and the (b) modified hexamethylene diisocyanate oligomer, while the hydroxyl groups in the (B) hardening agent mainly originate from the (c) polyol.

The adhesive agent set according to the present embodiment can be used to prepare a mixture (two-liquid hardening type urethane-based composition) by mixing the (A) main agent and the (B) hardening agent. The working atmosphere at the time of mixing the (A) main agent and the (B) hardening agent may be, for example, 10° C. to 35° C. and 40% to 60% RH (relative humidity).

The method of mixing the (A) main agent and the (B) hardening agent is not particularly limited and may be, for example, a method of mixing the agents by hand coating using a conventional caulking gun or may be a method of using a quantifiable pump (for example, a gear pump or a plunger pump) for feeding raw materials in combination with a throttle valve, and mixing the agents using a mechanical rotary mixer, a static mixer, or the like.

The prepared mixture (two-liquid hardening type urethane-based composition) can form an adhesive agent that adheres a base material to another base material when hardened. The conditions for hardening the mixture (curing conditions) may be, for example, 10° C. to 35° C. and 3 to 7 days.

A method for manufacturing a structural body of an embodiment includes sticking a first base material and a second base material together, with a mixture obtainable by mixing the main agent and the hardening agent in the above-mentioned adhesive agent set interposed therebetween, to obtain a structural body. Examples of the structural body include a back door panel, a trunk lid, and a windshield.

At least one of the first base material and the second base material may be a polypropylene base material. Examples of the base material other than a polypropylene base material for the first base material and the second base material include plastic base materials such as polyvinyl chloride, an acrylonitrile-butadiene-styrene copolymer (ABS), polycarbonate (PC), polyamide (PA), poly(methyl methacrylate) (PMMA), polyester, an epoxy resin, polyurethane (PUR), polyoxymethylene (POM), polyethylene (PE), an ethylene-propylene copolymer (EPM), and an ethylene-propylene-diene polymer (EPDM); fiber-reinforced plastic base materials such as a carbon fiber-reinforced plastic (CFRP) and a glass fiber-reinforced plastic (GFRP); and resin compound base materials such as a sheet molding compound (SMC). When the structural body is a back door for automobile, the first base material may be an inner panel formed from a polypropylene base material, and the second base material may be an outer panel.

The equivalent ratio of isocyanate groups (NCO) in the (A) main agent with respect to hydroxyl groups (OH) in the (B) hardening agent may be, for example, 1.0 to 5.0. The working atmosphere at the time of mixing the (A) main agent and the (B) hardening agent in the adhesive agent set may be, for example, 10° C. to 35° C. and 40% to 60% RH (relative humidity). The conditions for hardening the mixture may be, for example, 10° C. to 35° C. and 3 to 7 days.

EXAMPLES

Hereinafter, the present invention will be more specifically described by way of Examples. However, the present invention is not intended to be limited to these Examples.
[Preparation of Modified Body]

Production Example 1

Synthesis of Modified Hexamethylene Diisocyanate Oligomer (Modified Body A))

100 g of an isocyanurate form (trimer) of hexamethylene diisocyanate (trade name: SUMIDUR N3300, manufactured by Sumika Bayer Urethane Co., Ltd.), which is an unmodified hexamethylene diisocyanate oligomer, and 150 g of diisononyl phthalate as a plasticizer were introduced into a flask and heated to 100° C. to 120° C., and the mixture was stirred while being degassed to dehydrate the mixture until the moisture percentage became 0.01% or less. Subsequently, the mixture was cooled to 40° C., and 33 g of 3-mercaptopropyltrimethoxysilane (trade name: KBM-803, manufactured by Shin-Etsu Chemical Co., Ltd.) was added thereto, the amount being an amount in which the equivalent ratio of NCO groups of the isocyanurate trimer of hexamethylene diisocyanate with respect to SH groups of 3-mercaptopropyltrimethoxysilane (NCO groups/SH groups) was 3.1. 0.02 g of dibutyltin dilaurate (trade name: KS-1260, manufactured by Sakai Chemical Industry Co., Ltd.) was added thereto, and then the mixture was caused to react for about 60 minutes at 40° C. in a nitrogen atmosphere to obtain a reaction product having an NCO content of 5.2%. Since the ratio of NCO groups/SH groups was 3.1, it is speculated that the reaction product mainly includes a modified body A having an isocyanate group modified with 3-mercaptopropyltrimethoxysilane and two unmodified isocyanate groups.

Production Example 2

Synthesis of Modified Hexamethylene Diisocyanate Oligomer (Modified Body B))

100 g of a biuret form of hexamethylene diisocyanate (trimer) (trade name: DURANATE 24A-100, manufactured by Asahi Kasei Corp.), which is an unmodified hexamethylene diisocyanate oligomer, and 150 g of diisononyl phthalate as a plasticizer were introduced into a flask and heated to 100° C. to 120° C., and the mixture was stirred while being degassed to dehydrate the mixture until the moisture percentage became 0.01% or less. Subsequently, the mixture was cooled to 40° C., and 42 g of N-phenyl-3-aminopropyltrimethoxysilane (trade name: KBM-573, manufactured by Shin-Etsu Chemical Co., Ltd.) was added thereto, the amount being an amount in which the equivalent ratio of NCO groups of the biuret trimer of hexamethylene diisocyanate with respect to NH groups of N-phenyl-3-aminopropyltrimethoxysilane (NCO groups/NH groups) was 3.4. Subsequently, the mixture was caused to react for about 60 minutes at 40° C. in a nitrogen atmosphere to obtain a reaction product having an NCO content of 5.7%. Since the ratio of NCO groups/NH groups was 3.1, it is speculated that the reaction product mainly includes a modified body A having an isocyanate group modified with N-phenyl-3-aminopropyltrimethoxysilane and two unmodified isocyanate groups.

Comparative Production Example 1

Synthesis of Modified Body C)

100 g of an isocyanurate form (trimer) of toluene diisocyanate (trade name: D-204, manufactured by Mitsui Chemicals Polyurethane, Inc.) and 150 g of diisononyl phthalate as a plasticizer were introduced into a flask and heated to 100° C. to 120° C., and the mixture was stirred while being degassed to dehydrate the mixture until the moisture percentage became 0.01% or less. Subsequently, the mixture was cooled to 40° C., and 11.5 g of 3-mercaptopropyltrimethoxysilane (trade name: KBM-803, manufactured by Shin-Etsu Chemical Co., Ltd.) was added thereto, the amount being an amount in which the equivalent ratio of NCO groups of the isocyanurate form of toluene diisocyanate with respect to SH groups of 3-mercaptopropyltrimethoxysilane (NCO groups/SH groups) was 3.0. 0.02 g of dibutyltin dilaurate (trade name: KS-1260, manufactured by Sakai Chemical Industry Co., Ltd.) was added thereto, and then the mixture was caused to react for about 60 minutes at 40° C. in a nitrogen atmosphere to obtain a reaction product having an NCO content of 1.9%. Since the ratio of NCO groups/SH groups was 3.0, it is speculated that the reaction product mainly includes a modified body C having an isocyanate group modified with 3-mercaptopropyltrimethoxysilane and at least two unmodified isocyanate groups.
[Preparation of Main Agent Intermediate and Hardening Agent]
(Preparation of Main Agent Intermediate)

Into a kneading vessel equipped with a stirrer, a nitrogen inlet tube, a vacuum pump, and a heating and cooling device, 24.2 g of EXCENOL 837 (polypropylene glycol, manufactured by Asahi Glass Co., Ltd., number average molecular weight: 6000, number of functional groups: 3), 6.0 g of EXCENOL 2020 (polypropylene glycol, manufactured by Asahi Glass Co., Ltd., number average molecular weight: 2000, number of functional groups: 2), 13.8 g of MONARCH 460 (carbon black, manufactured by Cabot Corporation), 27.5 g of ICEBERG (calcined kaolin, manufactured by Shiraishi Calcium Kaisha, Ltd.), and 17.1 g of DINP (diisononyl phthalate) were introduced, and the mixture was stirred for 30 minutes at room temperature (25° C.) until lumps of carbon black disappeared. Next, the kneading vessel was heated until the content reached 100° C., the pressure inside the kneading vessel was reduced to reach 2.7 kPa (20 mmHg) using a vacuum pump, and the content was stirred for 1 hour. Next, the content was cooled until the temperature of the content reached 70° C., 7.3 g of MIL-LIONATE MT (4,4'-diphenylmethane diisocyanate, manufactured by Tosoh Corp., NCO content: 33.6%) and 0.02 g of KS-1260 (dibutyltin dilaurate, manufactured by Sakai Chemical Industry Co., Ltd.) were added to the kneading vessel, subsequently nitrogen was introduced thereto, and the content was stirred for 1 hour. The content was cooled until the temperature of the content reached 40° C., and this was used as a main agent intermediate.
(Preparation of Hardening Agent)

Into a kneading vessel equipped with a stirrer, a nitrogen inlet tube, a vacuum pump, and a heating and cooling device, 41.6 g of EXCENOL 837 (polypropylene glycol, manufactured by Asahi Glass Co., Ltd., number average molecular weight: 6000, number of functional groups: 3), 10.4 g of EXCENOL 2020 (polypropylene glycol, manufactured by Asahi Glass Co., Ltd., number average molecular weight: 2000, number of functional groups: 2), 1.2 g of EDP-1100 (polypropylene glycol, manufactured by ADEKA Corp., number average molecular weight: 260, number of functional groups: 4), 18.3 g of MONARCH 460 (carbon black, manufactured by Cabot Corporation), 11.8 g of ICE-BERG (calcined kaolin, manufactured by Shiraishi Calcium Kaisha, Ltd.), 15.2 g of DINP (diisononyl phthalate), 0.3 g of BHT (dibutylhydroxytoluene), 0.6 g of dehydrating agent MOLECULAR SIEVE 4A (dehydrating agent), and 0.6 g of KS-1260 (dibutyltin dilaurate, manufactured by Sakai Chemical Industry Co., Ltd.) were introduced, and the mixture was stirred for 30 minutes at room temperature (25° C.) until lumps of carbon black disappeared. Next, the kneading vessel was heated until the content reached 100° C., the pressure inside the kneading vessel was reduced to reach 2.7 kPa (20 mmHg) using a vacuum pump, and the content was stirred for 1 hour. Next, the content was cooled until the temperature of the content reached 40° C., and this was used as a hardening agent.

[Production of Adhesive Agent Set]

Example 1

(Main Agent)

4.2 g of the modified body A of Production Example 1 was added to the main agent intermediate, and the mixture was stirred for 10 minutes to obtain a main agent of Example 1.

(Hardening Agent)

The hardening agent prepared as described above was used as it was, as a hardening agent of Example 1.

Example 2

(Main Agent)

4.2 g of the modified body B of Production Example 2 was added to the main agent intermediate, and the mixture was stirred for 10 minutes to obtain a main agent of Example 2.

(Hardening Agent)

The hardening agent prepared as described above was used as it was, as a hardening agent of Example 2.

Example 3

(Main Agent)

2.1 g of the modified body A of Production Example 1 and 2.1 g of the modified body B of Production Example 2 were added to the main agent intermediate, and the mixture was stirred for 10 minutes to obtain a main agent of Example 3.

(Hardening Agent)

The hardening agent prepared as described above was used as it was, as a hardening agent of Example 3.

Comparative Example 1

(Main Agent)

1.05 g of a biuret trimer of hexamethylene diisocyanate (trade name: DURANATE 24A-100, manufactured by Asahi Kasei Corp.) and 3.15 g of 3-mercaptopropyltrimethoxysilane (trade name: KBM-803, manufactured by Shin-Etsu Chemical Co., Ltd.) were added to the main agent intermediate, and the mixture was stirred for 10 minutes to obtain a main agent of Comparative Example 1.

(Hardening Agent)

The hardening agent prepared as described above was used as it was, as a hardening agent of Comparative Example 1.

Comparative Example 2

(Main Agent)

4.2 g of the modified body C of Comparative Production Example 1 was added to the main agent intermediate, and the mixture was stirred for 10 minutes to obtain a main agent of Comparative Example 2.

(Hardening Agent)

The hardening agent prepared as described above was used as it was, as a hardening agent of Comparative Example 2.

The non-primer adhesiveness and heat aging resistance were evaluated according to the following methods using the above-mentioned main agents and hardening agents. The mixing mass ratio of the main agent and the hardening agent was set to 1:1.

[Non-Primer Adhesiveness]

Two sheets of a glass fiber-reinforced polypropylene base material that had been subjected to a flame treatment were prepared. Each of mixtures obtained by mixing the above-mentioned main agents and hardening agents of Examples 1 to 3 and Comparative Examples 1 and 2 was applied on one of the base materials so as to have a thickness of 3 mm, the base material was laminated on the surface of the other base material so as to have an adhesion area of 250 mm$^2$ (25 mm×10 mm), and the two sheets were pressure-bonded to produce a test specimen.

The produced test specimen was cured for 72 hours at 23° C., and a test specimen after curing was obtained. The obtained test specimen was subjected to a tensile test according to JIS K6850:1999 at 23° C., and shear strength was measured.

[Heat Aging Resistance]

Each of mixtures obtained by mixing the above-mentioned main agents and hardening agents of Examples 1 to 3 and Comparative Examples 1 and 2 was applied on a glass filler-containing polypropylene base material so as to have a thickness of 5 mm, and the applied base material was cured for 72 hours at 23° C. to produce a test specimen. Each of the test specimens was heated for 2 weeks at 90° C., the mixture after heating (adhesive agent) was cut with a knife, the cut part was picked up with hand and peeled off by pulling, and the peel state was observed (hand peeling test by knife cutting). In Table 1, the term "CF100" indicates that in the mixture after curing (adhesive agent), cohesive fracture occurred over the entire area (100%) of the adhesion surface. The terms "CF50" and "CF30" indicate that in the mixtures after curing (adhesive agent), cohesive fracture occurred in 50% and 30% of the adhesion surface, respectively. In the present test, as the proportion of cohesive fracture with respect to the adhesion surface is larger, the heat aging resistance is excellent.

The formulation composition of the materials and the evaluation results are shown in Table 1.

TABLE 1

| | | | Formulation composition [parts by mass] | | | | |
|---|---|---|---|---|---|---|---|
| | Material name | | Exam. 1 | Exam. 2 | Exam. 3 | Comp. Exam. 1 | Comp. Exam. 2 |
| (A) Main agent | (a) Urethane prepolymer | (a-1) EXCENOL 837 | 24.2 | 24.2 | 24.2 | 24.2 | 24.2 |
| | | (a-1) EXCENOL 2020 | 6.0 | 6.0 | 6.0 | 6.0 | 6.0 |
| | | (a-2) MILLIONATE MT | 7.3 | 7.3 | 7.3 | 7.3 | 7.3 |
| | (b) Modified hexamethylene diisocyanate oligomer | Modified body A | 4.2 | — | 2.1 | — | — |
| | | Modified body B | — | 4.2 | 2.1 | — | — |
| | Components other than component (b) | Modified body C | — | — | — | — | 4.2 |
| | | DURANATE 24A-100 | — | — | — | 3.15 | — |
| | | KBM-803 | — | — | — | 1.05 | — |
| | (d) Hardening catalyst | KS-1260 | 0.02 | 0.02 | 0.02 | 0.02 | 0.02 |
| | (e) Carbon black | MONARCH 460 | 13.8 | 13.8 | 13.8 | 13.8 | 13.8 |
| | (f) Filler | ICEBERG | 27.5 | 27.5 | 27.5 | 27.5 | 27.5 |
| | (g) Plasticizer | DINP | 17.1 | 17.1 | 17.1 | 17.1 | 17.1 |
| Total amount of (A) main agent | | | 100.12 | 100.12 | 100.12 | 100.12 | 100.12 |
| Viscosity of (A) main agent (20° C.) | | | 500 | 500 | 500 | 500 | 500 |
| (B) Hardening agent | (c) Polyol | EXCENOL 837 | 41.6 | 41.6 | 41.6 | 41.6 | 41.6 |
| | | EXCENOL 2020 | 10.4 | 10.4 | 10.4 | 10.4 | 10.4 |
| | | EDP-1100 | 1.2 | 1.2 | 1.2 | 1.2 | 1.2 |
| | (d) Hardening catalyst | KS-1260 | 0.6 | 0.6 | 0.6 | 0.6 | 0.6 |
| | (e) Carbon black | MONARCH 460 | 18.3 | 18.3 | 18.3 | 18.3 | 18.3 |
| | (f) Filler | ICEBERG | 11.8 | 11.8 | 11.8 | 11.8 | 11.8 |
| | (g) Plasticizer | DINP | 15.2 | 15.2 | 15.2 | 15.2 | 15.2 |
| | Ultraviolet absorber | BHT | 0.3 | 0.3 | 0.3 | 0.3 | 0.3 |
| | Dehydrating agent | MOLECULAR SIEVE 4A | 0.6 | 0.6 | 0.6 | 0.6 | 0.6 |
| (B) Total amount of hardening agent | | | 100 | 100 | 100 | 100 | 100 |
| (B) Viscosity of hardening agent (20° C.) | | | 700 | 700 | 700 | 700 | 700 |
| Non-primer adhesiveness (shear strength (MPa)) | | | 3.5 | 3.2 | 3.5 | 2.8 | 3.1 |
| Heat aging resistance (90° C., 336 h) | | | CF100 | CF100 | CF100 | CF30 | CF50 |

As shown in Table 1, the adhesive agent sets of Examples 1 to 3 that used main agents containing the modified body A of Production Example 1 and the modified body B of Production Example 2, which were the component (b), had excellent shear strength of the adhesive agent and also had superior heat aging resistance, as compared to the adhesive agent sets of Comparative Examples 1 and 2 that did not use such main agents. From these results, it was verified that with the adhesive agent sets of the present invention, adhesive agents having excellent non-primer adhesiveness and excellent heat aging resistance can be prepared.

The invention claimed is:

1. An adhesive agent set comprising a main agent and a hardening agent,
   wherein the main agent contains a urethane prepolymer having isocyanate groups as terminal groups; and an oligomer of hexamethylene diisocyanate having an isocyanate group modified with a silane coupling agent having a mercapto group, the oligomer also having at least two unmodified isocyanate groups,
   wherein the hardening agent contains a polyol,
   wherein the content of the urethane prepolymer is 30% to 40% by mass based on the total amount of the main agent, and
   wherein the content of the oligomer is 3% to 6% by mass based on the total amount of the main agent.

2. The adhesive agent set according to claim 1, wherein the oligomer is a trimer of hexamethylene diisocyanate having an isocyanate group modified with a silane coupling agent having a mercapto group, the trimer also having two unmodified isocyanate groups.

3. The adhesive agent set according to claim 1, wherein at least one of the main agent and the hardening agent further contains a hardening catalyst.

4. A method for manufacturing a structural body, the method comprising sticking a first base material and a second base material together, with a mixture obtainable by mixing the main agent and the hardening agent in the adhesive agent set according to claim 1 interposed therebetween, to obtain a structural body.

* * * * *